United States Patent [19]

Menzel et al.

[11] Patent Number: 5,110,666

[45] Date of Patent: May 5, 1992

[54] COATED FABRIC STRUCTURE FOR AIR BAG APPLICATIONS

[75] Inventors: Jill R. Menzel; John R. Damewood, both of Spartanburg, S.C.; Bert A. Ross, Conyngham, Pa.; Richard C. Kerr, Rutherfordton, N.C.

[73] Assignee: Reeves Brothers, Inc., Spartanburg, S.C.

[21] Appl. No.: 695,852

[22] Filed: May 6, 1991

Related U.S. Application Data

[63] Continuation-in-part of Ser. No. 326,183, Mar. 20, 1989, Pat. No. 5,013,811.

[51] Int. Cl.$^5$ .................. B32B 25/10; B32B 27/12; B32B 27/40; B60R 21/16
[52] U.S. Cl. ..................... 428/196; 280/728; 428/36.1; 428/36.8; 428/265; 428/272; 428/340; 428/341
[58] Field of Search ............... 280/728; 428/196, 265, 428/267, 272, 340, 341

[56] References Cited

U.S. PATENT DOCUMENTS

| | | | |
|---|---|---|---|
| Re. 31,671 | 9/1984 | Bonk et al. | 528/65 |
| 3,401,133 | 9/1968 | Grace et al. | 528/61 |
| 3,508,987 | 4/1970 | Burkley et al. | 156/99 |
| 3,539,424 | 11/1970 | Tasklick | 156/238 |
| 3,655,627 | 4/1972 | Hutzler et al. | 528/64 |
| 3,684,639 | 8/1972 | Keberle et al. | 156/331 |
| 3,758,443 | 9/1973 | Konig et al. | 260/75 NP |
| 3,764,457 | 10/1973 | Chang et al. | 161/183 |
| 3,823,051 | 7/1974 | Chang | 156/99 |
| 3,878,036 | 4/1975 | Chang | 428/424 |
| 3,883,571 | 5/1975 | Allport et al. | 260/453 AM |
| 3,886,102 | 5/1975 | Olstowski | 260/18 TN |
| 3,904,796 | 9/1975 | Zorn et al. | 528/61 |
| 3,935,132 | 1/1976 | Gerkin et al. | 260/2.5 BE |
| 4,031,026 | 6/1977 | Ibbotson | 252/182 |
| 4,072,634 | 2/1978 | Borchert et al. | 260/2.5 A |
| 4,088,616 | 5/1978 | Ichimura et al. | 260/2.5 AY |
| 4,115,429 | 9/1978 | Reiff et al. | 260/453 SP |
| 4,116,741 | 9/1978 | Thoma et al. | 428/423.3 |
| 4,118,411 | 10/1978 | Reiff et al. | 260/453 SP |
| 4,160,686 | 7/1979 | Niederdellmann et al. | 156/331 |
| 4,229,347 | 10/1980 | Holt et al. | 260/239 A |
| 4,234,714 | 11/1980 | Earing et al. | 528/67 |
| 4,239,857 | 12/1980 | Harper | 521/121 |
| 4,261,852 | 4/1981 | Carroll et al. | 528/59 |
| 4,306,052 | 12/1981 | Bork et al. | 528/67 |
| 4,307,004 | 12/1981 | Schuhmacher et al. | 528/61 |
| 4,321,333 | 3/1982 | Alberino et al. | 521/121 |
| 4,334,034 | 6/1982 | Lehner et al. | 525/28 |
| 4,384,050 | 5/1983 | Guthrie | 521/137 |
| 4,384,051 | 5/1983 | Guthrie | 521/137 |
| 4,423,200 | 12/1983 | Ganster et al. | 528/67 |
| 4,435,527 | 3/1984 | Cuscurida et al. | 521/173 |
| 4,448,938 | 5/1984 | Bruynickx et al. | 525/457 |
| 4,463,141 | 7/1984 | Robinson | 525/467 |
| 4,476,293 | 9/1984 | Robinson | 528/76 |
| 4,478,960 | 10/1984 | Buethe et al. | 521/160 |
| 4,490,300 | 12/1984 | Allen et al. | 260/453 SP |
| 4,490,301 | 12/1984 | Pantone et al. | 260/453 SP |
| 4,490,302 | 12/1984 | Ma et al. | 260/453 SP |
| 4,533,729 | 8/1985 | Newland et al. | 528/371 |
| 4,539,156 | 9/1985 | Dewhurst et al. | 260/453 SP |
| 4,539,157 | 9/1985 | Dewhurst et al. | 260/453 SP |
| 4,539,158 | 9/1985 | Dewhurst et al. | 260/453 SP |
| 4,581,388 | 4/1986 | Rasshofer et al. | 521/159 |
| 4,581,470 | 4/1986 | Hoy et al. | 560/189 |

(List continued on next page.)

FOREIGN PATENT DOCUMENTS

| | | |
|---|---|---|
| 61-76275 | 4/1986 | Japan . |
| 61-151235 | 7/1986 | Japan . |
| 1382186 | 1/1975 | United Kingdom . |
| 1476268 | 6/1977 | United Kingdom . |

Primary Examiner—James C. Cannon
Attorney, Agent, or Firm—Pennie & Edmonds

[57] ABSTRACT

A fabric substrate which is at least partially or selectively coated with a novel polycarbonate-polyether polyurethane for use as a driver's side or passenger side air bag. The polyurethane coating is applied in a manner which provides a desired permeability to the fabric, allows the fabric to be cut without fraying the fibers of the substrate, and imparts flexibility toughness and tear resistance to the final product.

20 Claims, 2 Drawing Sheets

U.S. PATENT DOCUMENTS

| | | | |
|---|---|---|---|
| 4,587,322 | 5/1986 | Rasshofer et al. | 528/60 |
| 4,621,105 | 11/1986 | Statton et al. | 521/107 |
| 4,634,743 | 1/1987 | Prier | 525/462 |
| 4,636,531 | 2/1987 | Schmidt | 528/60 |
| 4,647,596 | 3/1987 | Ishii et al. | 521/159 |
| 4,659,772 | 4/1987 | Hoy et al. | 524/755 |
| 4,663,417 | 5/1987 | Hunter et al. | 528/80 |
| 4,677,136 | 6/1987 | Rasshofer et al. | 521/159 |
| 4,683,171 | 7/1987 | Kuga et al. | 528/66 |
| 4,705,721 | 11/1987 | Frisch et al. | 528/66 |
| 4,727,094 | 2/1988 | Hoy et al. | 521/164 |
| 4,743,650 | 5/1988 | Boutni | 525/92 |
| 4,791,187 | 12/1988 | Süling et al. | 528/63 |
| 4,868,268 | 9/1988 | Muller et al. | 528/76 |
| 5,001,208 | 3/1991 | Ross et al. | 528/61 |
| 5,013,811 | 5/1991 | Menzel et al. | |

COATED FABRIC STRUCTURE FOR AIR BAG APPLICATIONS

CROSS REFERENCE TO RELATED APPLICATIONS

This application is a continuation-in-part of application Ser. No. 07/326,183, filed Mar. 20, 1989 now U.S. Pat. No. 5,013,811.

TECHNICAL FIELD

The present invention relates to an air bag for use in motor vehicles, the air bag being made of a synthetic fabric which is coated with a thin layer of a polyurethane material.

BACKGROUND OF THE INVENTION

Air bags for motor vehicles are known and have been used since the 1970's. The first type of bag was placed in the steering wheel and is conventionally referred to as the driver side air bag. A typical material from which the driver side air bags have been made is a neoprene coated nylon fabric material.

The neoprene material is useful because it acts as an impermeable insulation to the inflation medium. This inflation medium is generally a nitrogen gas which is generated from a gas generator or inflator and arrives into the bag at relatively warm temperatures. Thus, the neoprene substantially prevents the permeation of the fabric by the hot gas to thus avoid burns to the passenger. In addition to acting as an insulation shield and as a membrane which prevents gas from passing therethrough, the neoprene also gives additional integrity to the nylon fabric substrate.

In order to improve upon the passive restraint systems of automobiles, air bags are now being considered for use on the passenger side, as well as the driver side, in combination with three point seat belts for maximum safety to the vehicle occupants. On the passenger side, it is not necessary to construct the air bag of a coated fabric because cooler gas is introduced into the bag from the inflator. In addition, the bag on the passenger side is generally longer and of a different shape so that it retains the inflation gas for a longer period of time, with the gas cooling during the inflation. Accordingly, the use of a coated fabric is not necessary for a passenger side air bag and would not be preferred because of the additional cost considerations.

Therefore, passenger side air bags are generally made of an uncoated fabric or a very lightly coated fabric. Proposals have been made for preparing nylon fabrics which are uncoated but have sufficient permeability to retain the inflation gases therein. Such fabrics are described in U.S. Pat. Nos. 4,921,735 and 4,977,016.

When uncoated fabrics are used, however, there are problems involved with respect to the manufacture of such fabrics into an air bag. First of all, neoprene coated nylon fabrics are conventionally die cut to the proper shape before fabrication into the final air bag. It is difficult to die cut uncoated fabric because the fabric tends to fray in the areas where it is cut. Also, laser cutting can be used for preparing the desired shape of the fabric, but this is also undesirable for uncoated nylon fabric since, when a plurality of the fabrics are stacked upon each other and cut with the laser, they tend to fuse together in the area in which they are cut due to the melting of the nylon material. Furthermore, it is possible that an uncoated fabric could cause secondary injury due to permeation by hot gases through the fabric or by particulate matter which bypasses the inflator filter system. Thus, it would be desirable to have a fabric which includes a coating that sufficiently overcomes the aforementioned drawbacks of manufacture as well as to provide added safety to the passenger when the bag is deployed.

In today's market, polyurethane coated fabrics are utilized in a wide array of products and applications. Typically, polyurethane elastomers which are considered top of the line with respect to performance, include, for example, polytetramethylene glycol (polyether) polyurethanes and poly(butane adipates or hexane adipates) polyester polyurethanes. Of these polymers, the polyether polyurethanes exhibit good hydrolytic stability and low temperature properties but are generally poor for fuel resistance and oxidation resistance, while the polyester polyurethanes are tough with good abrasion resistance, oxidation resistance and fuel resistance, but not particularly resistant to hydrolysis. Still, at the present time the polyesters are generally considered to represent the best compromise of physical properties and chemical resistance of the various polyurethanes.

There are also a few polyurethanes based on polycarbonate polyols in the market. It is well known that these polycarbonate polyurethanes have very good hydrolytic stability and generally have good to very good resistance to other degradation forces; however, they are usually too hard, rigid and brittle for use in industrial coated fabrics.

Currently, high performance coated fabrics are based on polyester polyurethanes in order to meet the specifications currently in effect, but resistance to hydrolysis remains their weak point and represents a problem for these products. Thus, there is a desire for improved hydrolytic stability in a number of applications. A polyurethane having improved hydrolytic properties and sufficient elastomeric character to be useful in the manufacturing of industrial coated fabrics is also desirable and needed.

In addition, the construction of the fabric reinforcement is often important for increasing the strength of the coated fabric. The combination of a high performance polyurethane and fabric reinforcement provides a product which is flexible, tear resistant, resilient, foldable and tough.

Moreover, the fabric substrate is often manufactured in long wide rolls which are subsequently cut and trimmed for their end use. As noted above, uncoated fabrics fray during trimming and cutting operations. Coating the fabric material will often allow the fabric to be cut without the fabric fibers fraying but the prior art coatings often add unnecessary bulk and thickness to the fabric. There is a need for a process that will allow fabrics to be cut without the fabric fibers fraying and which does not add unnecessary bulk and thickness to the fabric. Additionally, there is a need for a coated fabric that is light weight, strong, flexible, foldable and impermeable so that the coated fabric may be used in the construction of air bags for either the passenger side or driver's side of an automobile.

SUMMARY OF THE INVENTION

In accordance with the present invention, a new coated fabric has been developed which is impermeable and easy to manufacture and process. The coated fabric is flexible, tough, tear resistant and can be cut and trimmed without fraying of the fabric fibers. The present invention relates to a fabric substrate which is at least partially coated with a polycarbonate-polyether polyurethane. The preferred polycarbonate-polyether polyurethane comprises a mixture of a polycarbonate polyol and a polyether polyol; a diisocyanate compound and first and second extender components. The first extender has a molecular weight of 500 or less and the diisocyanate compound is initially reacted with the first extender component in a molar ratio of above 2:1 to form a modified diisocyanate component having a functionality of about 2 prior to sequential reaction with the other components. The modified diisocyanate component provides relatively low temperature processing properties to the composition, whereas the polyol mixture provides superior hydrolytic stability and low temperature flexibility to the composition.

The fabric substrate is preferably a woven nylon having a weight of between about 2 and 8, preferably 4 and 6 ounces per square yard. The coating can be selectively applied to the fabric, preferably on areas that are to be cut so that the nylon fibers will not fray after the cutting operation. In addition, the coating can be applied in the form of stripes, dots, wavy lines or other patterns to obtain desired air permeability properties of the coated fabric.

For the lowest air permeability, the coating is applied to substantially cover the entire fabric. A coating weight of between 0.1 and 1, and preferably 0.25 to 0.75 ounces per square yard has been found to be suitable. This coating enables the coated fabric to be lightweight, foldable and cuttable without fraying the fibers of the fabric.

DETAILED DESCRIPTION OF THE INVENTION

Figure 1:
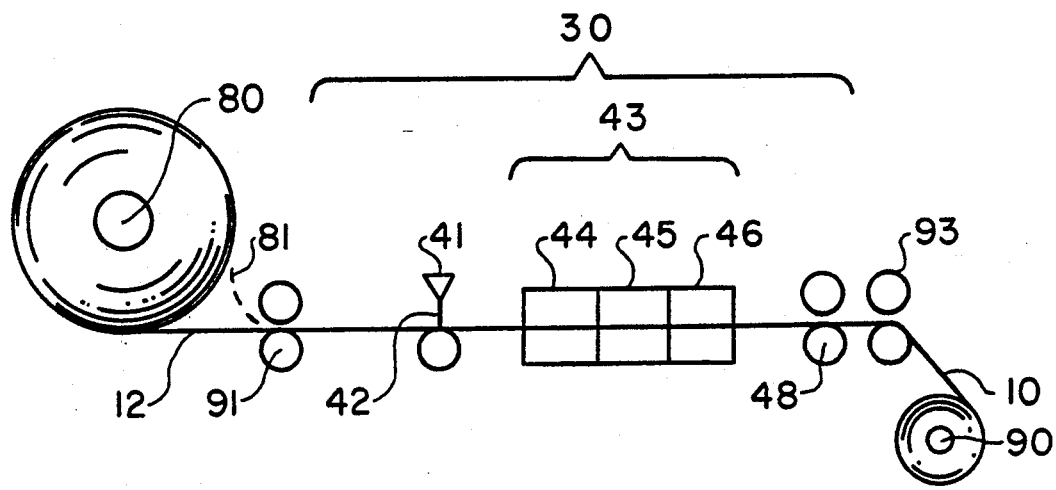
FIG. 1 schematically illustrates a single head coater machine as used in the manufacture of the coated fabric of the present invention.

The invention resides in a coated fabric having an unusual combination of physical properties which is especially useful for air bag applications where selective permeability, tear resistance, foldability, flexibility and toughness are required.

The present invention includes a fabric substrate, substructure or sheet material coated thereon with a polycarbonate-polyether polyurethane. While the term "coated fabric" is referred to herein, it is not limited to a "fabric " that is coated but generally refers to a base substrate or material, whether it is woven or nonwoven, to which a coating material is at least partially applied.

The preferred fabric is a nylon or other polyamide which is woven to the desired construction. Any type of denier size, shape, weaving configuration or the like can be used depending upon the results desired. The fabric is then coated with a very light layer or coating of the preferred polycarbonate-polyether polyurethane of the present invention.

The type and amount of coating to be applied will vary depending upon the results desired. For example, when low air permeability is the primary consideration, the entire surface of the bag can be coated with the desired amount of the polyurethane through the use of a single head coating apparatus or, when heavier coatings are desired, a three-head coating apparatus.

The polycarbonate-polyether polyurethane used comprises a mixture of a polycarbonate polyol and a polyether polyol; a diisocyanate compound; and first and second extenders. While this polyurethane is generally described below, U.S. Pat. Nos. 5,001,208 and 5,013,811 provide a more detailed description of this polyurethane and are expressly incorporated herein by reference thereto. The preferred polyurethane is available from Morton International as Morthane CA-1225.

The polyether polyol and polycarbonate polyol can be used in any relative amounts provided that each are present in the composition. It has been found convenient to use a polyether polyol:polycarbonate polyol ratio in the range of between 2:1 to 1:8.

Generally, polyols having a molecular weight of between about 60 and 500 (and preferably less than 250) have been found to be advantageous as extenders. Specific polyols include diols such as 1,3-butanediol, ethylene glycol, tripropylene glycol, dipropylene glycol, propylene glycol, and neopentyl glycol; triols such as trimethylol propane, as well as mixtures of these components, can be used. Amines, such as ethylene diamine can also be used as extenders.

Any diisocyanate compound is suitable with those based on 4,4'-diphenyl methane diisocyanate being preferred. The term "MDI" will be used throughout this application to designate diisocyanate compounds primarily based on 4,4'-diphenyl methane diisocyanate. The diisocyanate compound is initially reacted with one of the extenders in a molar ratio of about 2:1 so as to form a modified diisocyanate component having a functionality of about 2 prior to reaction with the other components. The term "liquid MDI" will be used to designate an essentially difunctional modified MDI component prepared from the reaction of a low molecular weight polyol with an MDI component to form a modified diisocyanate composition which is liquid at room temperature. Preferably, the modified diisocyanate is reacted sequentially, first with the polyol mixture, then with the other extender, so that a linear thermoplastic polyurethane is formed.

The relative amount of modified diisocyanate to polyol ranges from about 2:1 to 20:1, and preferably between about 2.5:1 and 8:1. The modified diisocyanate and the second extender enable the polymer to have low temperature processing properties compared to those wherein the diisocyanate is not modified. This polymer has elastomeric characteristics and other physical properties which render it suitable for use in coated fabric manufacturing processes, producing a coated fabric that is flexible, tough, tear resistant and resilient, having a high flexural endurance as well as good shape retention.

The overall stiffness or flexibility of the resulting fabric can be varied by increasing or decreasing the number of layers of polycarbonate-polyether polyurethane applied to the fabric.

Coated fabrics utilize a fabric substrate to give the coated fabric integrity. The fabric material may include one or more layers of fibers, filament, or spun yarns of various materials, weights, thicknesses and widths depending on the type of product which is desired. The various configurations of fabric are generally known in the art and need not be explained in detail here. While the fabric providing the best mechanical properties required for an air bag has been found to be a woven nylon fabric, the invention is not limited to woven fabrics and encompasses non-woven fabric substrates as well.

When woven fabrics are to be used, polyester or fiberglass or blends thereof would be suitable. Where smoother surfaces are desired, polyester fabrics would be preferred. Polyester fibers or fabrics also have less moisture absorption and better long term heat aging properties compared to nylon, and would be preferred for applications requiring such properties.

In air bag construction, a 420 denier nylon 66 filament yarn woven into a plain weave construction consisting of 48 warp (length direction) and 48 fill (cross width direction) yarns weighing 5.3 ounces per square yard ("osy"), heat set and scoured has been found to provide the optimum mechanical properties required for a fabric substructure for an air bag. However, fabric weights of between 2 and 8, and more preferably between about 4 and 6 ounces per square yard are suitable depending upon the exact end use of the coated fabric.

To the fabric substrate at least one or more layers of the above-described polycarbonate-polyether polyurethane (Morthane CA-1225) is applied. These several layers should contain the same polyurethane composition.

In FIG. 1, there is schematically illustrated a single head coater machine 30 including a fabric unwind roll 80 and take-up or wind-up roll 90. These components are preferably utilized to manufacture the coated fabric of the invention.

Figure 2:
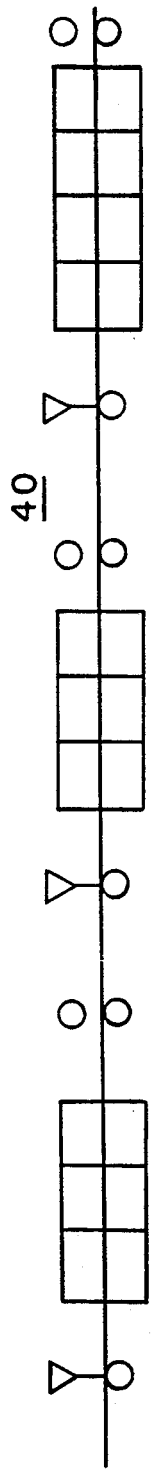
FIG. 2 schematically illustrates a three head coater machine.

While a single head coater machine is preferred, the coated fabric of the present invention can also be manufactured utilizing a three head coater machine, shown in FIG. 2 as 40, that is a coating machine with three heads, or the coated fabric can be produced by calendering the polymeric materials onto the fabric.

The single head coater machine 30 has a single coating system. The coating system contains a coating head 41 where a particular coating composition is deposited on the fabric substrate 12 as it passes through the machine 30.

Located at the coating head 41 is a knife blade 42. The knife blade 42 is independently adjustable. The knife blade can be set such that it does not contact the passing fabric substrate 12 or coated fabric 10. The knife blade can also be set to float or ride over the passing coated fabric 10 or fabric substrate 12, generally known as "floating knife", or the knife blade can be set to a predetermined setting, generally known as "knife over roll".

Located behind the knife blade 42 there is configured a single oven 43. Oven 43 contains three independently controlled zones 44, 45 and 46. These ovens are used to remove the solvent from the coating composition.

Following oven 43 there is provided a cooling roller or "can" 48. This coolong can 48 cools the fabric substrate 12 or coated fabric 10 as it exits the oven.

FIG. 2 schematically illustrates a three head coater machine as 40. The main difference between the three head coater machine 40 and the single head coater machine is that the three head coater can apply 3 layers of different or the same compositions during any single pass whereas the single head coater machine applies only one layer during any one pass. The three head coater machine is included as illustrative of the various means to coat the fabric, however, it is known in the art and as such is not described herein.

During operation, the fabric is mounted on unwind roll 80 and passed through rollers 91 and rollers 93 as well as the single head coater machine 30 from which the coated fabric substrate 12 exits and is mounted on take up roll 90.

The single head coater machine 30 applies the coating composition to only one side of the fabric substrate 12 and applies only a single composition during any one pass. To coat both sides of the material of the coated fabric, the roll of material on take up roll 90 after completely passing through the machine 30 will be remounted on unwind roll 80 such that the material will be fed into the machine 30 such that the coating composition will be applied to the second side of the coated fabric. This is illustrated in FIG. 1 by dashed line 81 which represents the coated fabric 10 unwinding from the unwind roll 80.

The fabric substrate 12 or coated fabric 10 can be passed through the single head coater machine at various rates of speed. By varying the speed the substrate moves, the amount of the composition applied, the blade settings and the oven temperatures, a wide array of coated fabrics can be manufactured. These variations are known to one skilled in the art and need not be detailed herein.

The fabric coated with polycarbonate-polyether polyurethane (Morthane CA-1225) bonds the fabric fibers in such a manner that when the fabric undergoes cutting operations the fibers do not fray. Additionally, the fabric coated with Morthane CA-1225 is lightweight since very little Morthane CA-1225 has to be added to the fabric to obtain the desired bonding effect which results in the fibers not fraying upon cutting or trimming. The fabric coated with Morthane CA-1225 has still a further advantage of being lightweight and impermeable as well as tear resistant, flexible and foldable making it very advantageous for use in air bag applications.

Generally, the entire fabric is coated with about 0.1 to 1 osy of the Morthane CA-1225, with about 0.25 to 0.75 osy being preferred. An optimum coating weight of about 0.5 osy provides the advantages described above so that the fabric is suited for use as an air bag material.

Conventional coated fabric air bags include exhaust ports for allowing the bag to deflate after deployment. Accordingly, it may be advisable in some situations to coat less than the entire surface of the fabric and, thus allow the permeability of the fabric to act as the exhaust port. A screen type roller or rotary screen printing device can be used to selectively apply the coating upon only specific areas of the fabric. In addition, a spray head or series of spray heads may be used to selectively deposit a particular or random pattern. The coating can be applied in the form of a pattern, including a stripe, dot, wavy line or other discriminant pattern design. The pattern can be arranged to achieve a desired permeability of the overall fabric, as well as a desired permeability for predetermined locations of the fabric by including designs where some of the fabric is impermeable while other parts of the fabric are permeable to the inflation gas.

Furthermore, when a selective or discriminant coating is applied, one area in which it would be highly desirable to apply the coating would be in the areas where the fabric is to be cut. Standard die cutting operations may, therefore, be utilized to cut the fabric without the problem of fraying or other disassociation of the fabric fibers. Thus, the coating locks together the fibers sufficiently to allow them to be cut by conventional methods.

Figure 3:
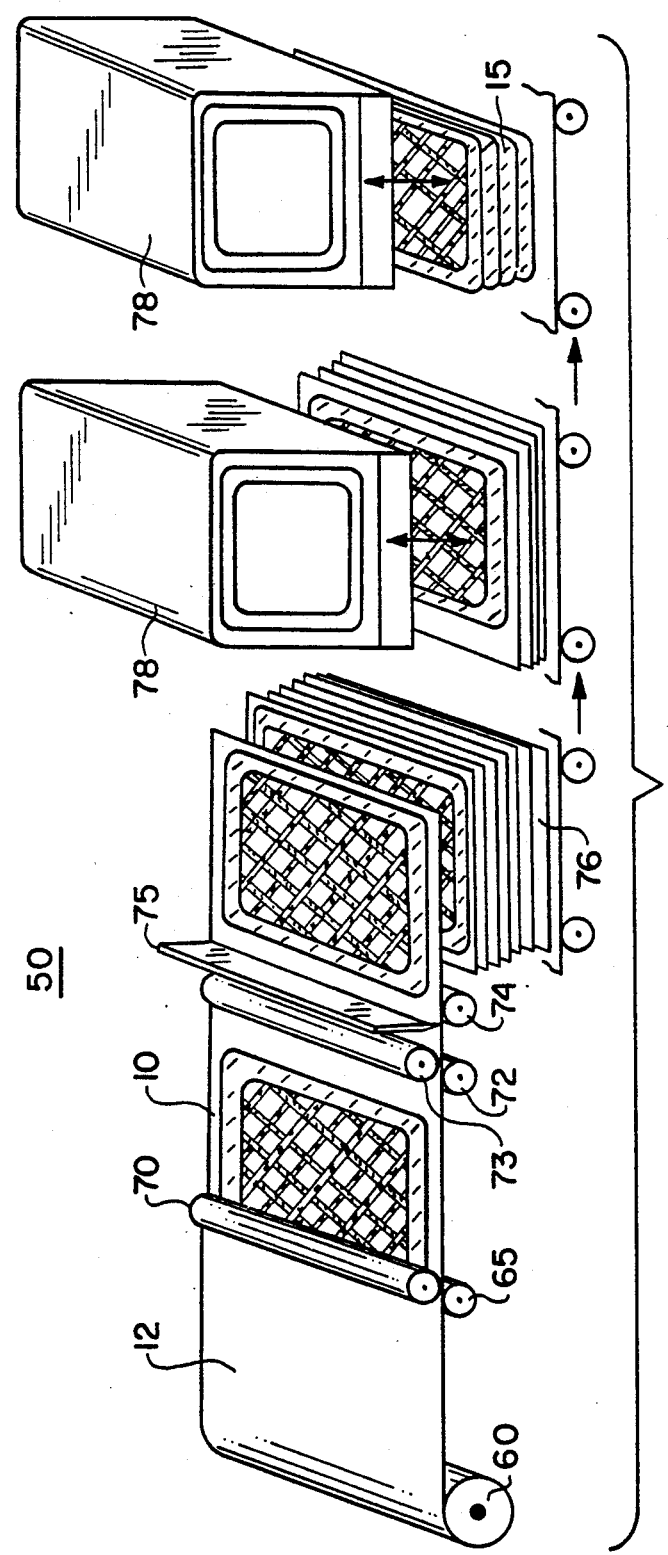
FIG. 3 schematically illustrates a means of selectively applying a coating composition on a fabric substrate.

In FIG. 3 there is illustrated a means of applying the coating upon only specific areas of the fabric through the use of a rotary screen printing device 50. First, the fabric substrate 12 is mounted on unwind roll 60 and roll 65 which feeds the fabric to the rotary screen roller 70 which selectively in a predetermined pattern applies the coating composition to the fabric substrate 12. After drying, selectively coated fabric 10 is then fed on rollers 72, 73 and 74 to the cutting station where the knife 75 cuts the selectively coated fabric at a predetermined length 76. These predetermined lengths 76 are stacked one on top of the other until a predetermined number are stacked as illustrated at 77. The predetermined lengths of selectively coated fabrics are then transported to a die cutting station where the die 78 performs the final cutting or trimming operation resulting in a fully trimmed selectively coated fabric 15 from which the air bag is formed by folding, gluing, bonding and/or stitching into the desired configuration.

Figure 4:
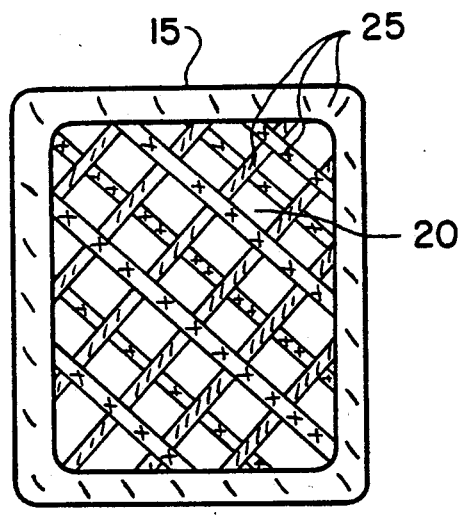
FIG. 4 illustrates various selective or discriminate coatings upon a fabric.

FIG. 4 illustrates a selectively coated fabric 15 which has been selectively coated to construct a coated fabric having a desired overall permeability as well as a permeability rate in certain locations of the fabric that has been selectively prearranged to provide the desired permeability of the final product. The selectively coated fabric 15 has uncoated areas 20 and coated areas 25.

When the entire surface of the fabric is to be coated, the common knife over roll spread coating technique can be utilized. Printed roll or reverse roll coatings can also be applied, but generally would not be preferred when the overall coating is fairly thin. Calendering may also be utilized to apply the elastomer to the fabric.

EXAMPLE

The scope of the invention is further described in connection with the following example which is set forth with the sole purpose of illustrating the embodiments of the invention and which are not to be construed as limiting the scope of the invention in any manner. Example 1 is the preferred embodiment of a coated fabric for use as an air bag material.

Example 1

The following example was prepared using the following compound:

| Component | Compound A | |
|---|---|---|
| | Wet Weight | Dry Weight |
| Polycarbonate-Polyether Polyurethane (Morthane CA-1225) | 74 | 74 |
| pigment | 6.74 | 6.74 |
| filler | 6 | 6 |
| Toluene (solvent) | 108 | 0 |
| DMF (solvent) | 72 | 0 |
| fungicide | 1.5 | 0.15 |
| Antimony Oxide | 6.8 | 6.8 |
| Plastizer (Santicizer 160) | 14.8 | 14.8 |
| Decabromodiphenyloxide (flame retardant) | 26.8 | 26.8 |

The pigment, filler, antimony oxide, Santicizer 160, decabromodiphenyloxide and solvents were mixed together and then the polycarbonate-polyether polyurethane was added. The components were mixed until all were completely in solution. The viscosity was then adjusted to 5000 cps.

A coated fabric is produced by taking a heat set, scoured nylon 66 fabric of plain weave weighing 5.3 osy and having a denier of 420 and 48 warp and 48 fill yarns and coating it with the above described compound in the following manner:

The fabric is passed through the machine 30 at 10 ypm. To the first side of the fabric, 0.5 osy of compound A is applied at the coating head 41. As the fabric passes through the machine, the knife blade 42 is set on the rollers, i.e., as the knife over roll embodiment described above, while oven zone 44 is set at 50° C., oven zone 45 is set at 90° C. and oven zone 46 is set at 120° C.

The final coated fabric has a finished weight of 5.8 osy, and can be easily die cut without experiencing fraying of the nylon fibers. It can be readily fabricated into the desired shape of the air bag, and can be tightly folded for compact storage in the vehicle until deployed.

What is claimed is:

1. A coated, fabric comprising a fabric substrate and a coating at least partially covering said substrate, said coating comprising a polyurethane formed from a polyol mixture of a polycarbonate polyol and a polyether polyol, a diisocyanate compound and first and second extender components, wherein the diisocyanate compound is initially reacted with the first extender component in a molar ratio of above 2:1 to form a modified diisocyanate component having a functionality of about 2 prior to reaction with the polyol mixture and the second extender component.

2. The coated fabric of claim 1 wherein the first extender component has a molecular weight of about 500 or less and the modified diisocyanate is reacted sequentially with the polyol mixture then the second extender component so that a linear thermoplastic polyurethane is prepared.

3. The coated fabric of claim 1 wherein the coating is applied to those portions of the fabric which will be cut to form a desired shape or configuration of the fabric.

4. The coated fabric of claim 3 wherein the coating is applied in an amount sufficient to prevent fraying or other separation of the fabric fibers when the fabric is cut.

5. The coated fabric of claim 1 wherein the coating is applied to portions of the fabric in a desired pattern to impart a desired air permeability to the fabric.

6. The coated fabric of claim 5 wherein the coating is applied as stripes, dots, or wavy lines.

7. The coated fabric of claim 1 wherein the fabric has a weight of between 2 and 8 ounces per square yard and the coating substantially covers the entire fabric.

8. The coated fabric of claim 7 wherein the coating has a weight of between 0.1 and 1 ounce per square yard.

9. The coated fabric of claim 1 wherein the fabric substrate is a woven nylon or woven polyester.

10. A coated fabric comprising a fabric substrate having a weight of between about 2 and 8 ounces per square yard and a coating at least partially covering said substrate, said coating comprising a linear polyurethane formed from a polyol mixture of a polycarbonate polyol and a polyether polyol, a diisocyanate compound, and first and second extender components, wherein the first extender component has a molecular weight of 500 or less and the diisocyanate compound is initially reacted with the first extender component in a molar ratio of above 2:1 to form a modified diisocyanate component having a functionality of about 2 prior to sequential reaction with the polyol mixture and the second extender component.

11. The coated fabric of claim 10 wherein the coating is applied to those portions of the fabric which will be cut to form a desired shape or configuration of the fabric.

12. The coated fabric of claim 11 wherein the coating is applied in an amount sufficient to prevent fraying or other separation of the fabric fibers when the fabric is cut.

13. The coated fabric of claim 10 wherein the coating is applied to portions of the fabric in a desired pattern to impart a desired air permeability to the fabric.

14. The coated fabric of claim 13 wherein the coating is applied as stripes, dots, or wavy lines.

15. The coated fabric of claim 10 wherein the coating has a weight of between 0.1 and 1 ounce per square yard.

16. The coated fabric of claim 10 wherein the fabric substrate is a woven nylon or woven polyester.

17. A coated fabric comprising a fabric substrate having a weight of between about 2 and 8 ounces per square yard and a coating substantially covering said substrate, said coating comprising a linear polyurethane formed from a polyol mixture of a polycarbonate polyol and a polyether polyol, a diisocyanate compound, and first and second extender components, wherein the first extender component has a molecular weight of 500 or less and the diisocyanate compound is initially reacted with the first extender component in a molar ratio of above 2:1 to form a modified diisocyanate component having a functionality of about 2 prior to sequential reaction with the polyol mixture and the second extender component.

18. The coated fabric of claim 17 wherein the coating has a weight of between 0.1 and 1 ounce per square yard.

19. The coated fabric of claim 17 wherein the fabric substrate is a woven nylon or woven polyester having a weight of between about 4 and 6 ounces per square yard.

20. The coated fabric of claim 19 wherein the coating has a weight of between about 0.25 and 0.75 ounces per square yard.

* * * * *

UNITED STATES PATENT AND TRADEMARK OFFICE
CERTIFICATE OF CORRECTION

PATENT NO. : 5,110,666

DATED : May 5, 1992

INVENTOR(S) : Menzel et. al.

It is certified that error appears in the above-identified patent and that said Letters Patent is hereby corrected as shown below:

On the title page, item [56], please add:

OTHER PUBLICATIONS

Starner et al., "New Prepolymer Chemistry Enhances Cast PU," Rubber and Plastics News, Oct. 19, 1987, pp. 28-30.

Signed and Sealed this

Sixth Day of July, 1993

Attest:

MICHAEL K. KIRK

Attesting Officer

Acting Commissioner of Patents and Trademarks